(12) United States Patent
Vitou et al.

(10) Patent No.: US 9,845,830 B2
(45) Date of Patent: Dec. 19, 2017

(54) PROFILED ADJUSTMENT NUT

(71) Applicant: ABB Technology AG, Zurich (CH)

(72) Inventors: Alexander Brian Vitou, St. Charles, SC (US); Thomas Eric Kuckhoff, Greenville, SC (US)

(73) Assignee: ABB Schweiz AG, Baden (CH)

( * ) Notice: Subject to any disclaimer, the term of this patent is extended or adjusted under 35 U.S.C. 154(b) by 106 days.

(21) Appl. No.: 14/874,552

(22) Filed: Oct. 5, 2015

(65) Prior Publication Data
US 2017/0097050 A1    Apr. 6, 2017

(51) Int. Cl.
*F16D 7/02*    (2006.01)
*F16D 13/72*    (2006.01)

(52) U.S. Cl.
CPC ............ *F16D 7/025* (2013.01); *F16D 13/72* (2013.01); *Y10T 464/10* (2015.01)

(58) Field of Classification Search
CPC ......... F16D 7/025; F16D 13/72; Y10T 464/10
USPC ............................................... 464/17, 46–48
See application file for complete search history.

(56) References Cited

U.S. PATENT DOCUMENTS

| | | | | |
|---|---|---|---|---|
| 2,753,703 A | * | 7/1956 | McIntyre | F16D 7/025 464/46 X |
| 2,939,301 A | * | 6/1960 | Huddle | F16D 7/025 464/48 X |
| 3,111,824 A | * | 11/1963 | Firth | F16D 7/025 464/46 |
| 3,605,443 A | * | 9/1971 | Redelman | F16D 7/025 464/46 |
| 2015/0114785 A1 | * | 4/2015 | Beigang | F16D 13/72 |

OTHER PUBLICATIONS

Excerpt titled "Features/Benefits; Torque-Tamer" from Baldor-Dodge 2010 PT Components Engineering Catalog; Baldor Electric Company; Aug. 2010.
Instruction Manual for Torque-Tamer(TM); Baldor Electric Company; Mar. 2011.

* cited by examiner

*Primary Examiner* — Gregory J Binda
(74) *Attorney, Agent, or Firm* — Taft Stettinius & Hollister LLP

(57) ABSTRACT

A slip clutch includes a driven member, a spring, at least one friction plate interfacing with the driven member and an adjustment nut. The friction plate is pressed against the driven member through the combination of the spring and adjustment nut. The adjustment nut has multiple lobes and profiled surfaces between the lobes having a smaller radius from the axis of rotation of the clutch than the lobes. A hub extends along the axis through the driven member, spring, friction plate, and adjustment nut. The adjustment nut is rotationally fixed with respect to the hub and has a reduced profile to improve airflow to other components of the slip clutch.

15 Claims, 7 Drawing Sheets

PROFILED ADJUSTMENT NUT

FIELD OF INVENTION

This disclosure concerns torque limiting devices, and in particular drive shaft mounted slip clutch or safety clutch devices.

BACKGROUND

Slip clutches, also termed safety clutches or torque limiters, allow for transmission of maximum allowable torques and also protect the drivetrain by slipping when excessively high torques are encountered. Under normal operation, a slip clutch mounted to a driving shaft can transfer torque between a motor and the equipment coupled to the drive shaft. When the equipment enters a mode of operation where excessive torque is experienced, for example when the equipment becomes jammed with a foreign objects or during intermittent torque overload conditions, the slip clutch decouples the movement of the motor from the drive shaft, and in the process protects the entire mechanism from transferring undesirably high torques and damaging the motor, drive shaft and other elements of the drive train. An example of such a slip clutch is the Baldor-DODGE TORQUE-TAMER™.

Heat is typically produced in the clutch during slippage. With increased heat, the clutch can break down faster. Further, the operation of such slip clutches depends on the coefficient of friction between components of the clutch that transfer motion. The coefficient of friction itself has temperature dependency, such that at higher temperatures, the clutch may slip at different torques than it would at lower temperatures. Heat dissipation is limited, in part, by lack of airflow through the clutch mechanism.

SUMMARY OF THE INVENTION

A slip clutch includes a driven member, a spring, at least one friction plate interfacing with the driven member and an adjustment nut. The friction plate is pressed against the driven member through the combination of the spring and adjustment nut. The adjustment nut has multiple lobes and profiled surfaces between the lobes having a smaller radius from the axis of rotation of the clutch than the lobes. A hub extends along the axis through the driven member, spring, friction plate, and adjustment nut. The adjustment nut is rotationally fixed with respect to the hub.

BRIEF DESCRIPTION OF THE DRAWINGS

In the accompanying drawings, structures and methods are illustrated that, together with the detailed description provided below, describe aspects of a profiled adjustment nut. It will be noted that a single component may be implemented as multiple components or that multiple components may be implemented as a single component. The figures are not drawn to scale and the proportions of certain parts have been exaggerated for convenience of illustration. Further, in the accompanying drawings and description that follow, like parts are indicated throughout the drawings and written description with the same reference numerals, respectively.

DETAILED DESCRIPTION

Figure 1:
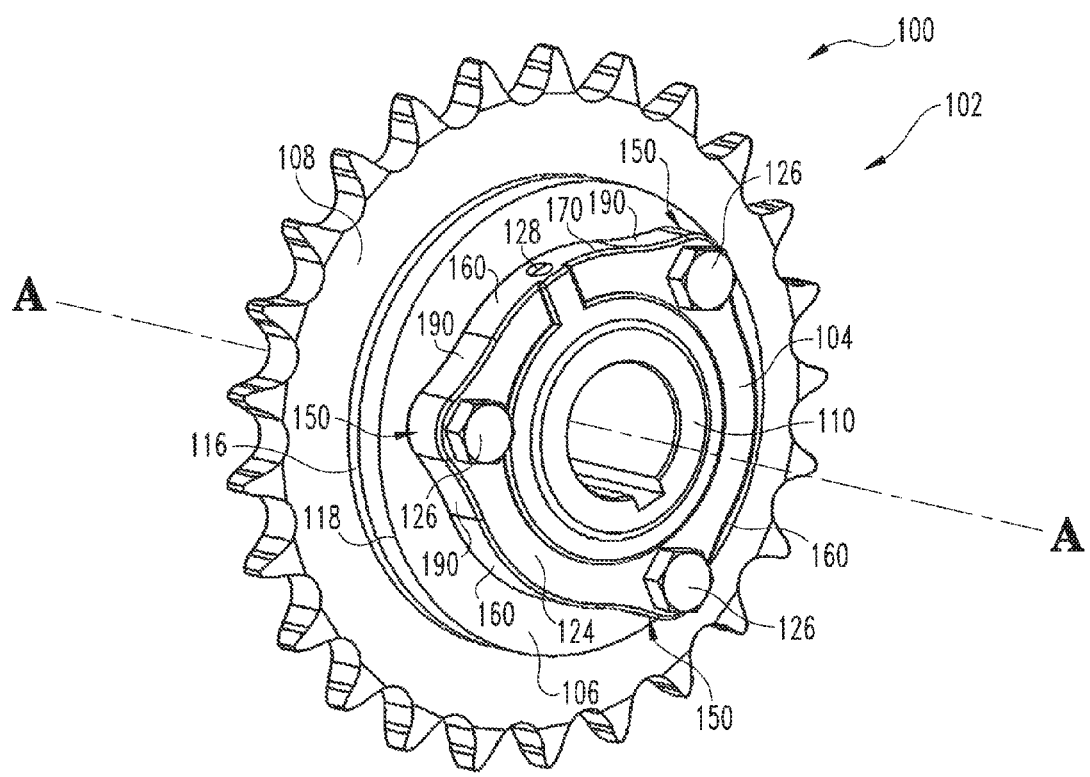
FIG. 1 illustrates a perspective view of the drive train apparatus 100.
Figure 2:
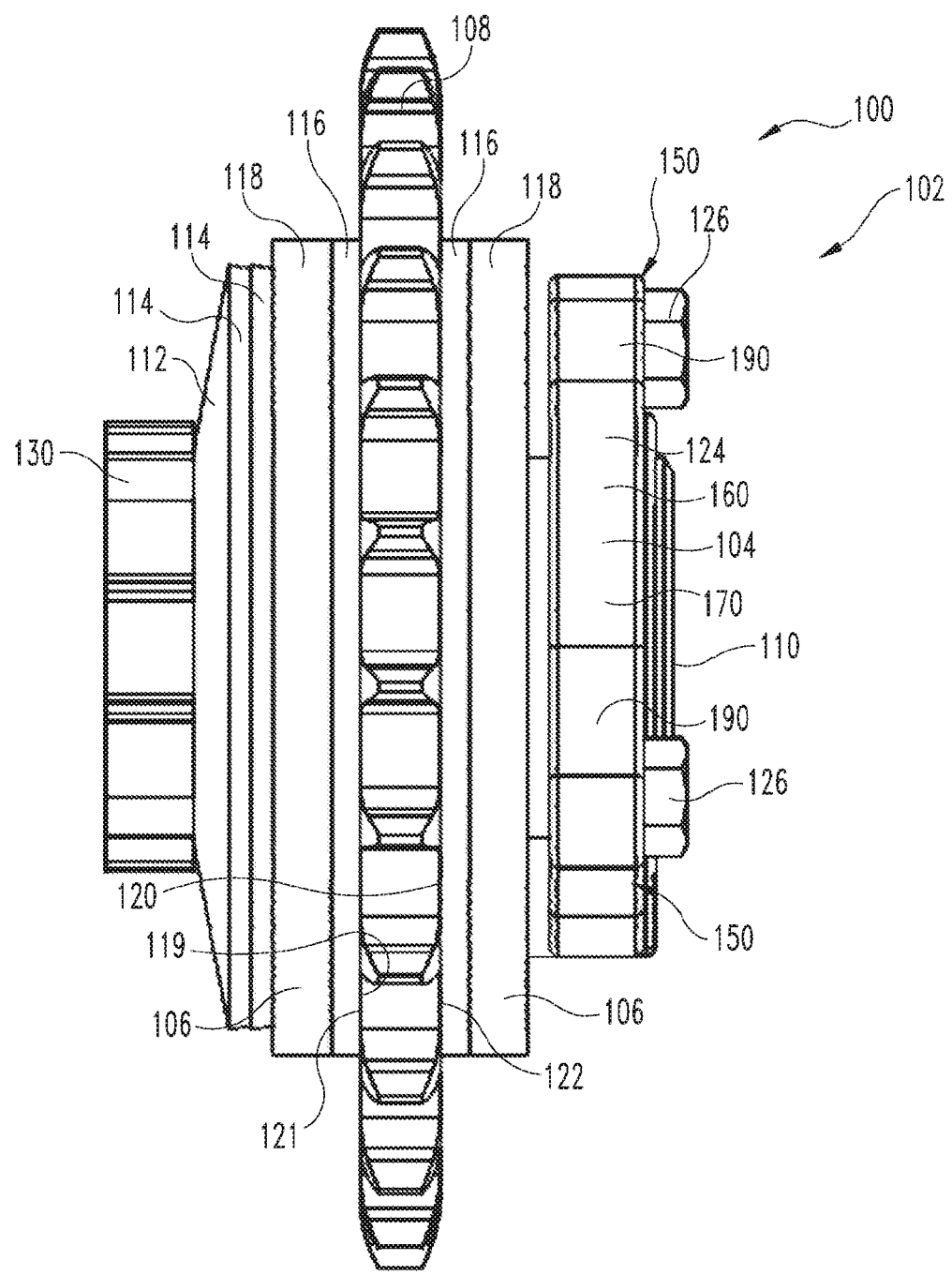
FIG. 2 illustrates a side view of apparatus 100.
Figure 3:
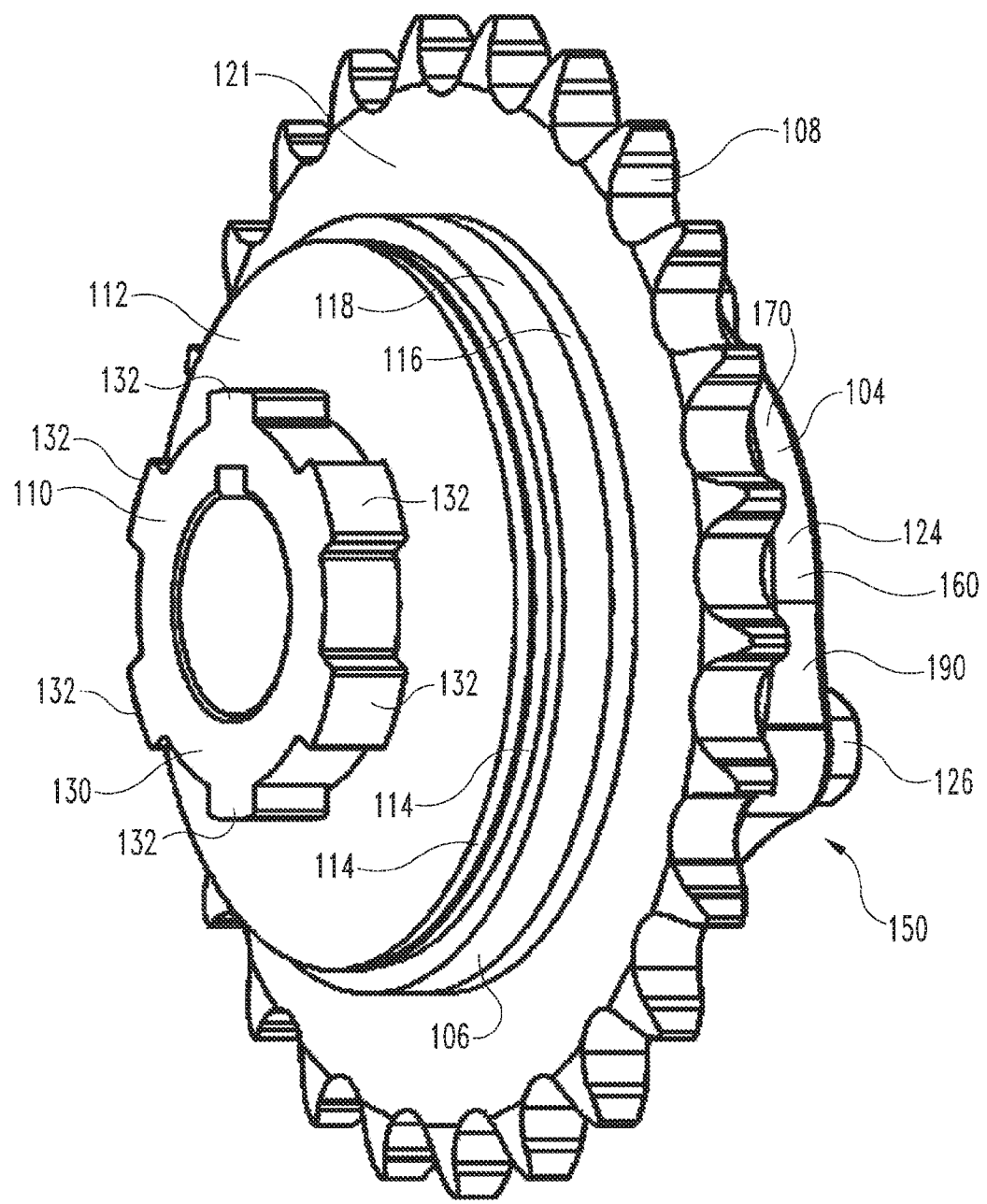
FIG. 3 illustrates a second perspective view of the drive train apparatus 100.

With reference to FIGS. 1 through 3, a drive train device 100 includes a slip clutch 102. The slip clutch 102 has an adjustment nut 104 that can be manipulated to adjust the contact forces or normal forces between friction plates 106 and a driven member 108. The driven member 108 is depicted as a sprocket, but can also take the form of a cog, gearwheel, pinion, sprocket, sheave or other mechanism producing or transferring rotational motion. A hub 110 extends along an axis A, representing the axis of rotation of the device 100 during operation. The hub 110 extends through the adjustment nut 104, friction plates 106, driven member 108, and spring 112. The spring 112 includes two compression springs 114 stacked one against the other. The spring 112 can have one or more compression springs 114 that apply biasing force toward the adjustment nut 104. Drive train device 100 includes two friction plates 106 on opposite sides of the driven member 108. The friction plates 106 include friction discs 116 and pressure plates 118. The friction discs 116 are disposed between driven member 108 and its corresponding pressure plate 118. A surface 119, 120 of the friction discs 116 can be in contact with a respective surface 121, 122 of the driven member 108. In the depicted device the surfaces 119, 120 of the friction discs 116 and surfaces 121, 122 of the driven member 108 are annular flat surfaces. However, the surfaces 119, 120 of the friction discs 116 and surfaces 121, 122 of the driven member 108 can take different shapes including different complementary annular shapes.

The adjustment nut 104 is in contact with one of the friction plates 106. The adjustment nut 104 includes an adjustment nut body 124 and tensioning members 126 that extend through the adjustment nut body 124 in a direction parallel to the axis A, which direction is also referred to herein as the axial direction. The three tensioning members 126 are axially adjustable with respect to the adjustment nut body 124 and are in contact with the friction plate 106 closer to the nut body 122. The adjustment nut 104 can be adjustably fixed with respect to hub in the rotational direction and in the axial direction. For example, by selectively loosening or tightening a setscrew 128 that can engage the hub 110, the adjustment nut 104 can be secured in a particular rotational and axial position with respect to the hub 110. When fixed to the hub 110 in this way, the adjustment nut 104 rotates with the hub 110. The hub 110 and driven member 108 rotate at the same speed and when the drive train apparatus 100 is driven at torques having a value under which slippage occurs between the friction plates 106 and driven member 108.

The friction plates 106 can also be rotationally secured to the hub 110, for example by incorporating a keyed hole through with a complementarily keyed hub 110 is inserted. The keyed hole and hub could prevent rotational motion of the plates 106 with respect to the hub 110. The depicted driven member 108 remains rotationally free with respect to the hub 110 except for circumstances where the friction plates 106 are in contact with the driven member 108 with sufficient force. A collar can be inserted between the hub 110 and driven member 108. Like the driven member 108, the collar can also rotate about the hub 110 freely, or can be rotationally fixed with respect to the hub 110, for example in a manner similar to the plates 106. The driven member 108 rotates freely with respect to the hub 110 and intermediate collars.

The spring 112 sits between a stop 130 and friction plate 106. The stop 130 limits the movement of the spring 112 in the axial direction. The stop 130 is depicted including six radial protrusions 132 against which the spring 112 makes contact. The stop 130 supplies the opposing force against the biased spring 112. A stop according to the present teachings can take other forms, too, such as a flange or other forms of radial protrusions at the end of the hub 110. When the spring 112 is in contact with the stop 130, pressing the spring toward the stop 130 in the axial direction increases the biasing force of the spring in the direction of the adjustment nut 104.

Figure 4:
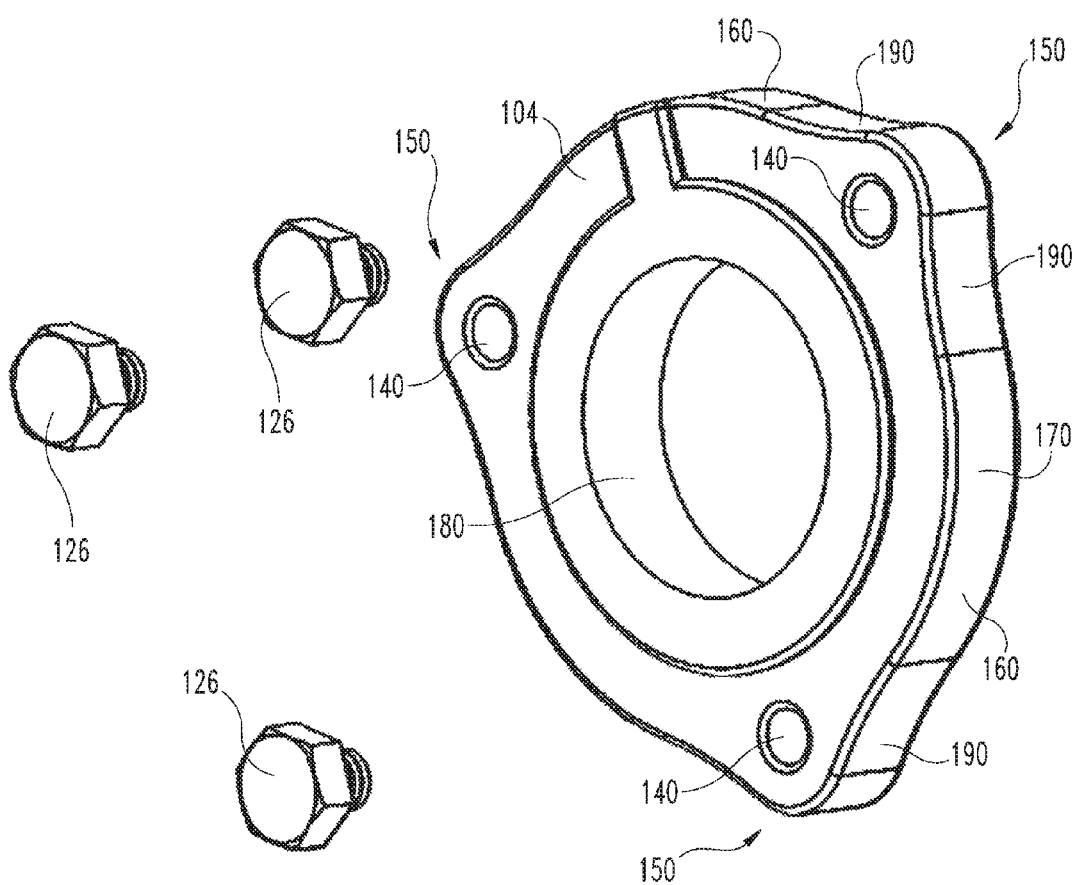
FIG. 4 illustrates an exploded view of adjustment nut 104.

With regard to FIG. 4, the tensioning members 126 are hex-headed threaded bolts that are inserted into threaded holes 140 at the lobes 150. The lobes 150 accommodate the tensioning members 126, and their placement, which is further from axis A than the profiled surfaces 160, allows desired placement of the tensioning members 126 relative to the friction plates 106 while minimizing the overall amount of material in the nut body 124. The profiled surfaces 160 between the lobes 150 have a reduced radius relative to the lobes 150. The radially outer surface 170 defines, in part, both the lobes 150 and profiled surfaces 160. The internal opening 180 of adjustment nut body 124 can be threaded to meet a threaded surface of a hub 110.

Figure 5:
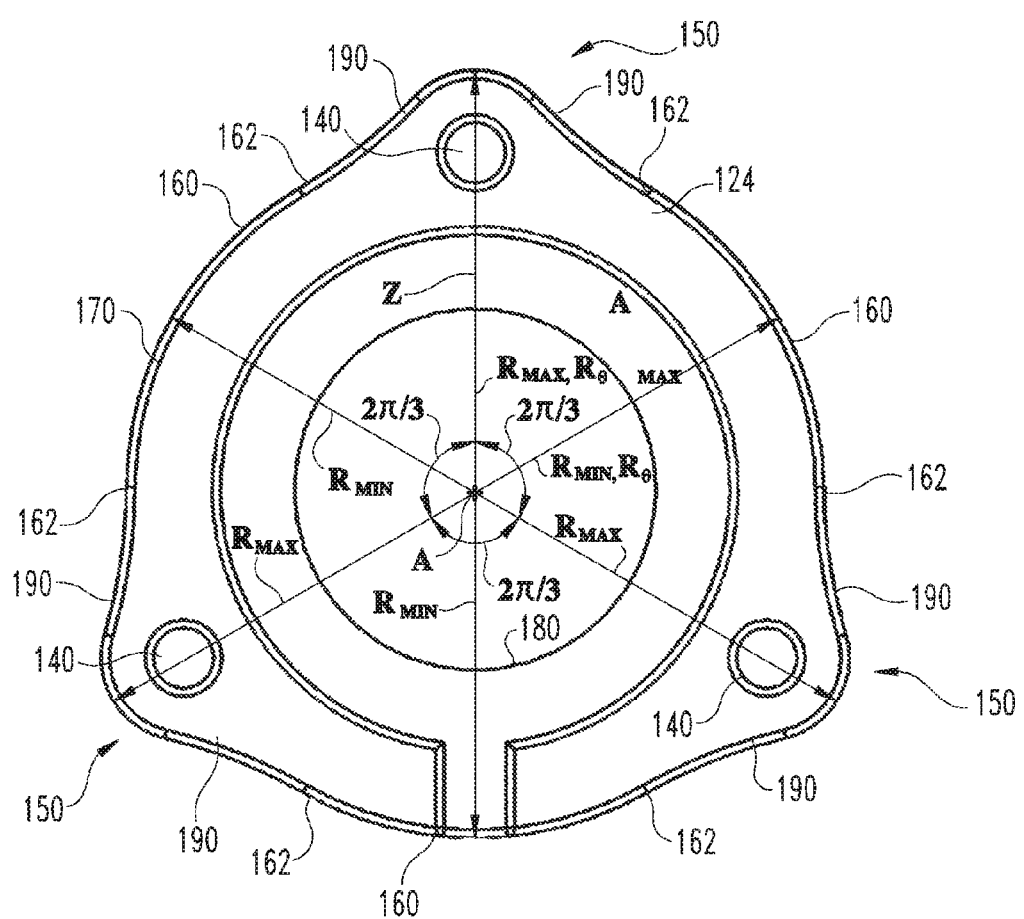
FIG. 5 illustrates a front view of adjustment nut body 124.

With reference to FIG. 5, the adjustment nut 104 has three lobes 150 extending radially further from the axis of rotation A than the profiled surfaces 160 between the lobes 150. An adjustment nut 104 according to the present teachings can have two or more lobes 150, and according to one aspect of the present teachings has at least three lobes 150. The radially outer surface 170 of the adjustment nut 104 defines the radially outermost location of the nut 104 from the axis A when viewing the nut 104 along the axis A of rotation. The radially outer surface 170 has a maximum distance from the axis of rotation A, $R_{MAX}$, at the lobes 150. In particular, a line segment from the axis of rotation A through the center of the threaded holes 140 to the point on the outer surface 170 furthest from the axis A measures $R_{MAX}$. The adjustment nut 104 has the radius $R_{MAX}$ at each of the three lobes 150. The lobes 150 and the lines labelled $R_{MAX}$ are about circumferentially equidistant from one another, spaced apart by $2\pi/3$ radians. The symmetric placement of the lobes 150, and therefore of the tensioning members 126, allows for more evenly distributed force applied to the pressure plate 118.

As seen in FIG. 5, viewed along the axis A the outer surface 160 defines a shape symmetric over rotations of $2\pi/3$ radians about the axis A. Thus, the contour formed by the outer surface 170 as viewed along the axis A will appear the same before and after rotation of the nut 104 about A by $2\pi/3$ radians. According to one aspect of the present teachings, the adjustment nut 104 can have an outer surface 170 having a shape that is n-fold symmetric, appearing the same after rotations of $2\pi/n$ about the axis of rotation A. In the illustrated case, the three-fold symmetry of the nut body 124 corresponds to the symmetry over rotations of $2\pi/3$.

With continued reference to FIG. 5, the distance $R(\Theta)$ is the radial distance from the axis A to the outer surface 170 at the angle $\Theta$ measured from the vertical line Z. $R(\Theta)$ has a smaller value smaller than $R_{MAX}$ over the entire profiled surface 160. $R(\Theta)$ also has a smaller average value than $R_{MAX}$ over the entire profiled surface 160, which average value can be determined by integrating the distance $R(\Theta)$ over the domain of $\Theta$. It should be noted that the profiled surface 160 need not have a distance $R(\Theta)$ less than $R_{MAX}$ over the entire profiled surface 160, but instead can have such a reduced radius surface over at least a portion of the outer surface 170 between the lobes 150.

The lobes 150 extend radially outwardly from the axis A relative to the adjacent profiled surfaces 160. The adjustment nut 104 has a reduced radius at the profiled surfaces 160 relative to the lobes 150. The smallest value of $R(\Theta)$ over the outer surface 170 is $R_{MIN}$, which occurs at each of the three profiled surfaces 160, including where marked by lines $R_{MIN}$. The lines $R_{MIN}$ are spaced equidistantly from each of the adjacent lines $R_{MAX}$ by an angular distance of $\pi/3$ radians, and equidistantly $2\pi/3$ radians from one another. The profiled surface 160 is defined in part by a portion of the outer surface 170 having a fixed radius $R(\Theta)$ of $R_{MIN}$ as viewed along axis A over a range of angles $\Theta$. The profiled surface 160 has a constant radial distance $R_{MIN}$ from the axis A between the inflections 162, at which point the radius of the profiled surface 160 begins to increase as it transitions to the lobe 150. Due to their fixed radius relative to axis A, the profiled surfaces are cylindrically shaped in the region between inflections 162. Each of the profiled surfaces 160 has a radius $R(\Theta)$ of $R_{MIN}$ over a range of about $\pi/3$ radians between adjacent lobes 150. The total range of the three profiled surfaces 160 totals about $\pi$ radians.

The profiled surfaces 160 can have a reduced size and volume relative to the lobes 150 by several measures, including but not limited to having an average radius that is less than the peak value of the radius of the adjustment nut body 124, having an average radius than is less than the average radius of the lobes 150, having a minimum radius that is less than the peak value of the radius of the adjustment nut body 124, or having a minimum radius that is less than the average value of the radius of the adjustment nut body 124 at lobes 150. For lobes 150 having different heights, the profiled surfaces 160 can have a reduced radius relative to an individual lobe 150 or a combined measure of their radii from axis A.

The reduction in total material in the nut 104 due to the shape of the profiled surfaces 160 can improve airflow to other components of the slip clutch 102 and allow heat to dissipate more quickly, which can in turn improve longevity of the overall drive train component 100. The absence of additional material where the profiled surfaces 160 are located permits increased airflow through those regions, which would otherwise be blocked but for the profiled surfaces 160. During rotation, a fanning effect is also exhibited as the rotating lobes 150 and profiled surfaces 160 disturb the surrounding air. The lack of non-essential material at the profiled surfaces allows for convective heat dissipation rather than relying primarily on conductive and radiative dissipation. The adjustment nut body 124 can be formed from casting, machining, forging, and forming. The adjustment nut body 124 can be made partially or entirely from powdered metal, which can exhibit greater heat dissipation characteristics than certain solid metals such as cast iron. It should be noted that the adjustment nut body 124 can be made of a variety of materials, including but not limited to powdered or solid cast or machined metals.

Assembly of the component 100 can include sliding the spring 112 to stop 130, and then sliding one of the friction plates 106 onto the hub 110, whether as an individual unit or separate friction disk 116 and pressure plate 118, such that the friction disk 116 is contact with the driven member 108 and the pressure plate 118 is in contact with the springs. The friction plates 106 can have a keyed opening complementary to the hub 110 such that the plates 106 are rotationally fixed with respect to the hub 110. The driven member 108 is then slid over the hub 110, which can be followed by an additional friction plate 106, again with the friction disk 116 facing and in contact with the driven member 108, and the pressure plate 118 on the opposite side of the friction disk 116 relative to the driven member 108. The adjustment nut 104 is then threaded over the end of the hub 110, and rotationally secured with setscrew 128, which can be screwed into an available spline on hub 110. Once rotationally fixed, the nut 104 is also axially fixed due to the threaded interface with hub 110. Fixed both axially and rotationally, the nut 104 can be adjusted to apply force in the axial direction against springs 112. By tightening the tensioning members 126 the contact force increases, which increases the frictional force between the intervening components, and in particular between the friction discs 116 and driven member 108. The nut 104 can be selectively placed along the hub 110 such that the tensioning members 126 can be adjusted, to press on the adjacent friction plate 106 with a desired force. As the tensioning members 126 are adjusted to provide greater or lesser force on the friction plate 106, the spring 112 on the distal side of the hub 110 applies and equal and opposite force to its respective friction plate 106. The driven member 108 can then be driven with an appropriate chain or belt, and the entire clutch 102 will rotate, transferring the rotational motion synchronously until a torque higher than the slippage threshold occurs, in which case the clutch will slip until the torque returns to a suitable level. The slippage torque can be increased by tightening the friction plates 106 against the driven member 108, which can be done by tightening tensioning members 126. Slippage torque can be decreased by lowering the contact force between the friction plates 106 and the driven member 108 by loosening the tensioning members 126 of the adjustment nut 104.

Figure 6:
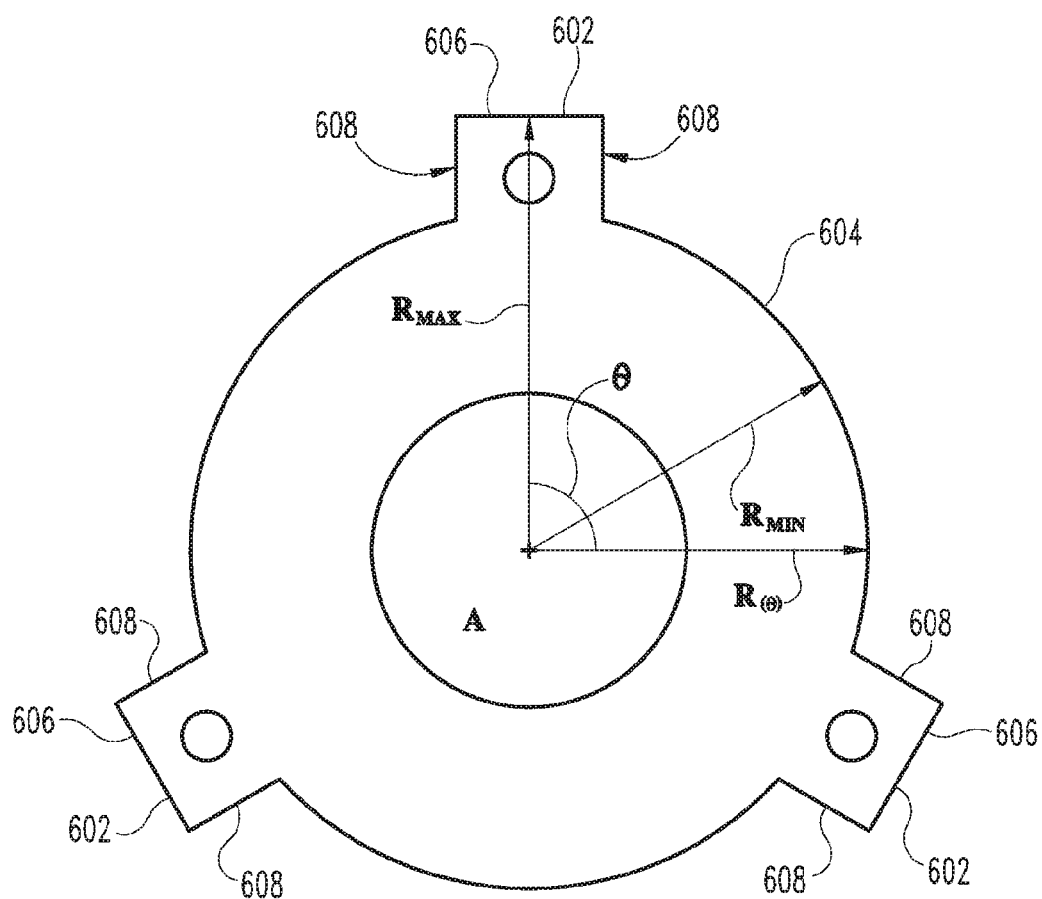
FIG. 6 illustrates a front view of an adjustment nut body 600.

The lobes 150 and profiled surfaces 160 of an adjustment nut 104 can both take different shapes than that depicted in FIGS. 1-5. As just one non-limiting example, FIG. 6 depicts an adjustment nut body 600 where the lobes 602 are block shaped protrusions extending further radially from an axis A than any point on adjacent profiled surfaces 604. Each of the lobes 602 includes an end surface 606 that can be an arcuate surface a constant distance $R_{MAX}$ from axis A, and sides 608 that can be collinear with lines extending from the axis A. The lobes 608 need not be this specific shape and can alternatively be square, rectangular, trapezoidal, or other geometric shapes. Holes 610 permit insertion of tensioning members such as members 126 at the lobes 602. The profiled surfaces 604 are cylindrical in shape, having a radius of $R_{MIN}$ measured from axis A over the entirety of each profiled surface 604. The profiled surfaces 604 need not be so shaped, and could take other shapes, such as other curved shapes having a variable distance $R(\Theta)$ smaller than $R_{MAX}$ between the lobes 602. The lobes 602 and profiled surfaces 604 depicted in FIG. 6 are clearly demarcated, with the profiled surface 604 ending at the sides 608, at which point the lobes 602 begin. However, the division between profiled surfaces 604 and lobes 602 need not be so clearly demarked. For example, a transition surface 190, as shown in FIGS. 1-5 can bridge the area between and overlap with profiled surfaces and lobes, such as profiled surfaces 160 and lobes 150. In addition, lobes such as lobes 602 can be configured to hold more than one tension member 126.

Figure 7:
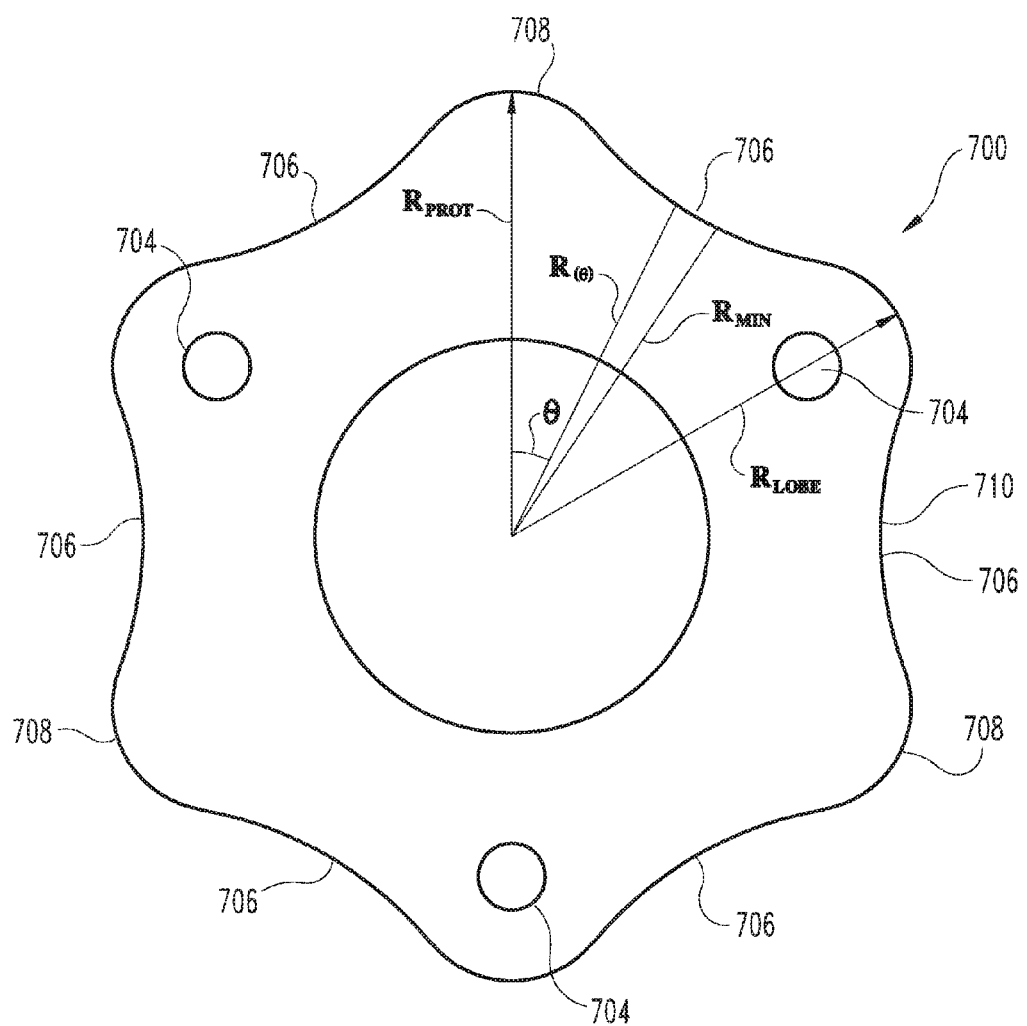
FIG. 7 illustrates a front view of an adjustment nut body 700.

With reference to FIG. 7, another adjustment nut 700 according to the present teachings includes three lobes 702, each having a hole 704 for insertion of a tensioning member such as member 126. Profiled surfaces 706 and protrusions 708 are found between the lobes 702 and are defined at least in part by radially outer surface 710. The lobes 702 extend outwardly from adjacent profiled surfaces 706 and have a maximum radius $R(\Theta)$ of $R_{LOBE}$. The profiled surfaces 706 have a radius $R(\Theta)$ that is less than $R_{LOBE}$, including where the radius is $R_{MIN}$, the minimum distance from axis A to the outer surface 710. The profiled surfaces 706 are interrupted by protrusions 708 that extend outwardly by a maximum distance $R_{PROT}$, which distance can be less than, equal to or be greater than $R_{LOBE}$. As shown in FIG. 7, two profiled surfaces 706 can be found between lobes 702 with a reduced radius relative to an adjacent lobe 702. Moreover, according to the present teachings, two or more profiled surfaces, such as profiled surfaces 706, can be found between lobes, such as lobes 702, with a reduced radius relative to a lobe.

Testing of clutch 102 assembly including an adjustment nut such as nut 104 formed from cast iron concluded that adjustment nut 104 provided increased airflow relative to prior designs, which did not include profiled surfaces 160 but instead had an annularly shaped adjustment nut with a generally cylindrical outer surfaces. Further, use of the nut 104 resulted in lower operating temperatures measured at the friction plates 106, in one case reducing operating temperature from 147° to 116° Fahrenheit.

Unless otherwise specified, "a" or "an" means "one or more." To the extent that the term "includes" or "including" is used, it is intended to be inclusive in a manner similar to the term "comprising" as that term is interpreted when employed as a transitional word in a claim. The term "or" (e.g., A or B) means "A or B or both." When the applicants intend to indicate "only A or B but not both" then the term "only A or B but not both" will be employed. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about A to B is intended to mean from about A to about B, where A and B are the specified values.

The description of various embodiments and the details of those embodiments is illustrative and is not intended to restrict or in any way limit the scope of the claimed invention to those embodiments and details. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention.

The invention claimed is:

1. A slip clutch apparatus comprising:
   a driven member;
   a spring;
   at least one friction plate in contact with the driven member;
   an adjustment nut in contact with the at least one friction plate, the adjustment nut having a plurality of lobes and a plurality of profiled surfaces between the lobes, the adjustment nut being rotatable about an axis of rotation; and,
   a hub extending along the axis of rotation through the driven member, the spring, the friction plate and adjustment nut, the adjustment nut rotationally fixed with respect to the hub, wherein the adjustment nut includes an adjustment nut body and at least one tensioning member extending from the adjustment nut body along the axis of rotation in contact with the at least on friction plate, the at least one tensioning member being axially adjustable relative to the adjustment nut body to provide greater or lesser force between the at least one friction plate and the driven member.

2. The slip clutch apparatus of claim 1, wherein at least one tensioning member is disposed at each of the plurality of lobes.

3. The slip clutch apparatus of claim 1, wherein the adjustment nut has a maximum radial distance from the axis of rotation at one or more of the lobes, the profiled surfaces having a smaller radial distance from the axis of rotation than the maximum radial distance.

4. The slip clutch apparatus of claim 3, wherein the adjustment nut has three lobes.

5. The slip clutch apparatus of claim 1, wherein the adjustment nut has three lobes.

6. The slip clutch apparatus of claim 1, wherein the plurality of lobes are disposed circumferentially equidistantly about the adjustment nut body.

7. The slip clutch apparatus of claim 1, wherein the adjustment nut has a maximum radial distance from the axis of rotation at each of the lobes, the profiled surfaces having a smaller radial distance from the axis of rotation than the maximum radial distance.

8. The slip clutch apparatus of claim 1, wherein the plurality of profiled surfaces include cylindrical portions having a constant radial distance from the axis of rotation.

9. The slip clutch apparatus of claim 1, further comprising:
   a first friction plate and a second friction plate each having a friction surface in contact with the driven member, and,
   a first surface and a second surface of the driven member wherein the friction surface of the first friction plate is in contact with the first surface, the friction surface of the second friction plate is in contact with the second surface, and wherein the adjustment nut is in biasing contact with the first friction plate.

10. The slip clutch apparatus of claim 1, wherein the spring biases the driven member and adjustment nut against the friction plate.

11. The slip clutch apparatus of claim 10, wherein the spring biases the driven member with enough force to rotate the hub synchronously with the driven member up to a slip torque.

12. The slip clutch apparatus of claim 1, wherein the adjustment nut includes an adjustment nut body that is made from a powdered metal.

13. The slip clutch apparatus of claim 12, wherein the adjustment nut body is made entirely from powdered metal.

14. The slip clutch apparatus of claim 1, wherein the at least one tensioning member is threadingly engaged with the adjustment nut body.

15. The slip clutch apparatus of claim 14, wherein the at least one tensioning member is a hex-headed threaded bolt.

* * * * *